United States Patent [19]

Manabe

[11] Patent Number: 4,478,407

[45] Date of Patent: Oct. 23, 1984

[54] MONITOR GAME MACHINE

[75] Inventor: Katsuki Manabe, Tokyo, Japan

[73] Assignee: Kabushiki Kaisha Sigma, Tokyo, Japan

[21] Appl. No.: 436,992

[22] Filed: Oct. 27, 1982

[30] Foreign Application Priority Data

Nov. 24, 1981 [JP] Japan .......................... 56-174297[U]

[51] Int. Cl.³ ...................... A63G 31/14; A63G 31/16
[52] U.S. Cl. ................................ 272/18; 74/471 XY;
434/43; 434/45; 434/58; 200/5 A
[58] Field of Search ..................... 272/17, 18; 434/43,
434/44, 45, 46, 55, 56, 57, 58, 62, 69, 29; 74/471
XY; 200/5 A, 6 A; 273/1 E, 1 G, 1 GA, 1 GC,
1 GE, 85 G, 313, DIG. 28

[56] References Cited

U.S. PATENT DOCUMENTS

| | | | |
|---|---|---|---|
| 2,369,418 | 2/1945 | St. John | 434/44 |
| 3,031,775 | 5/1962 | Cohen | 434/45 |
| 3,173,686 | 3/1965 | Rettie et al. | 272/17 |
| 3,295,224 | 1/1967 | Cappel | 434/58 |
| 3,618,256 | 11/1971 | Monks | 434/55 X |
| 3,619,911 | 11/1971 | Pancoe | 434/58 |
| 3,708,636 | 1/1973 | Sobchak | 200/6 A |
| 4,019,261 | 4/1977 | Pancoe | 434/58 |
| 4,066,256 | 1/1978 | Trumbull | 272/18 |
| 4,095,791 | 6/1978 | Smith et al. | 273/85 G |
| 4,303,236 | 12/1981 | Czarnecki | 272/18 |

Primary Examiner—Richard T. Stouffer
Attorney, Agent, or Firm—Koda and Androlia

[57] ABSTRACT

A monitor game machine comprising a cock-pit or driver cabin in which a player is seated, a monitor disposed at the front of said cock-pit, and a steering device operated by the player in response to pictures displayed on the screen of said monitor. The driver seat is inclined backward and forward, and right and left in response to the movement of said steering device.

2 Claims, 4 Drawing Figures

MONITOR GAME MACHINE

BACKGROUND OF THE INVENTION

This invention relates to a monitor game machine operated by a player seated in a simulated cock-pit or driver cabin of an airplane, a car or the like steering in response to pictures displayed on the screen of a monitor disposed at the front of the driver cabin.

Recently the monitor game machine has been adapted to display on the screen various pictures, such as flying enemy's bombers, various traffic situations on roads or the like, and in response to them the player steers, pushing a fire button to shoot down enemy's bombers or driving at high speeds avoiding cars.

The monitor game machine has the cock-pit or driver cabin in which the player is seated and the monitor located at the front of the cock-pit. The cock-pit is fixed stationary, and thus the monitor game machine has a drawback of the lack of reality to be felt by the player during gaming.

SUMMARY OF THE INVENTION

In view of the lack of reality of the conventional monitor game machine, it is an object of this invention to provide a monitor game machine to make the player feel real enough by causing the cock-pit or driver cabin to swing backward and forward, and right and left in response to the movement of a steering device.

According to this invention, there is provided a monitor game machine comprising a cock-pit or driver cabin in which a player is seated; a monitor disposed at the front of the cock-pit; and a steering device operated by a player in response to pictures displayed on the screen of the monitor, characterized in that the cock-pit is inclined backward and forward, and right and left in response to the movement of the steering device.

The nature, utility and further features of this invention will be more clearly apparent from the following detailed description with respect to a preferred embodiment of the invention when read in conjunction with the accompanying drawings.

DETAILED DESCRIPTION OF THE INVENTION

Figure 1:
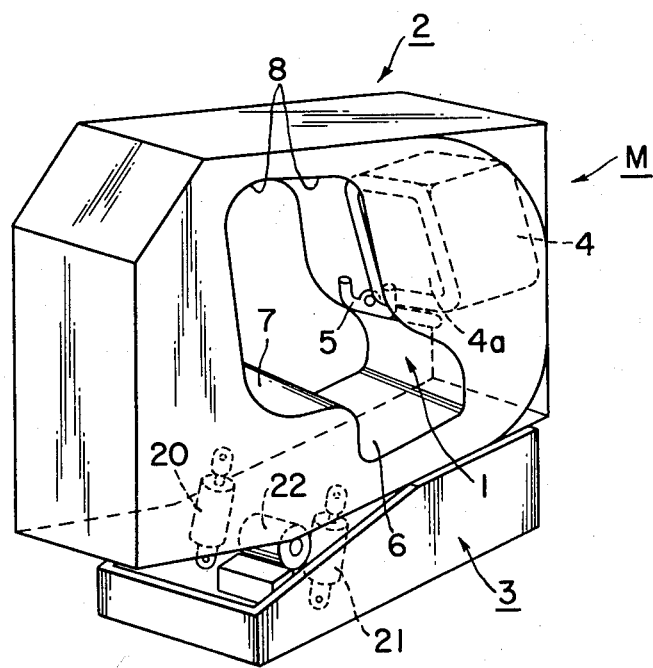
FIG. 1 shows a perspective view of the monitor game machine of this invention.

In FIG. 1, the monitor game machine M of this invention includes a box 2 housing a simulated cock-pit or driver cabin 1 of an airplane or a spaceship, and the box 2 is supported on a support base 3 swingably backward and forward, and right and left.

A television monitor 4 is located at the front of the cock-pit 1. On the screen of the monitor 4, pictures such as flying enemy's bombers, other obstacles, etc., are displayed as if they came close to or went away from the pilot.

A steering (controlling) device 5 is disposed below the screen. The box 2 is inclined backward and forward, and right and left by operating the steering device 5. A floor plate 6 is spread over the bottom of the box 2. A pilot (player) seat 7 is provided at the rear of the cock-pit 1. Openings 8 for getting in and out of the cock-pit 1 are provided in both sides of the box 2.

Figure 2:
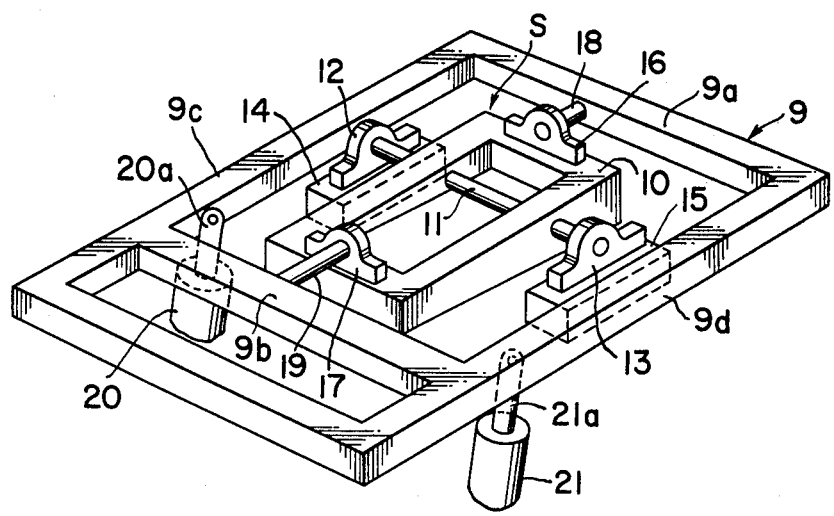
FIG. 2 shows a perspective view of a frame supporting a box.

As shown in FIG. 2, the bottom of the box 2 is supported by a rectangular frame 9. The frame 9 is supported by a swing mechanism S swingably backward and forward, and right and left with respect to the support base 3.

The swing mechanism S has a swing inner frame body 10 swingable backward and forward, and right and left. The swing inner frame 10 is supported on a lateral shaft 11 swingably backward and forward thereabout. The lateral shaft 11 is retained at both ends thereof rotatably by retaining members 12, 13. The retaining members 12, 13 are mounted on base members 14, 15 secured to the support base 3. Retaining members 16, 17 are secured to the front and the rear of the inner frame 10. Longitudinal shafts 18, 19 are retained by the retaining members 16, 17 at one ends thereof and at the other ends are secured to the centers of the lateral frame 9a, 9b of the frame 9.

The piston rods 20a, 21a of operational cylinders 20, 21 are secured at the upper ends thereof to the rear portions of the longitudinal frames 9c, 9d of the frame 9. The lower ends of the hydraulic cylinders 20, 21 are pivotally connected to both sides of the rear portion of the support base 3. A hydraulic pump 22 is disposed at the center of the support base 3.

Figure 3:
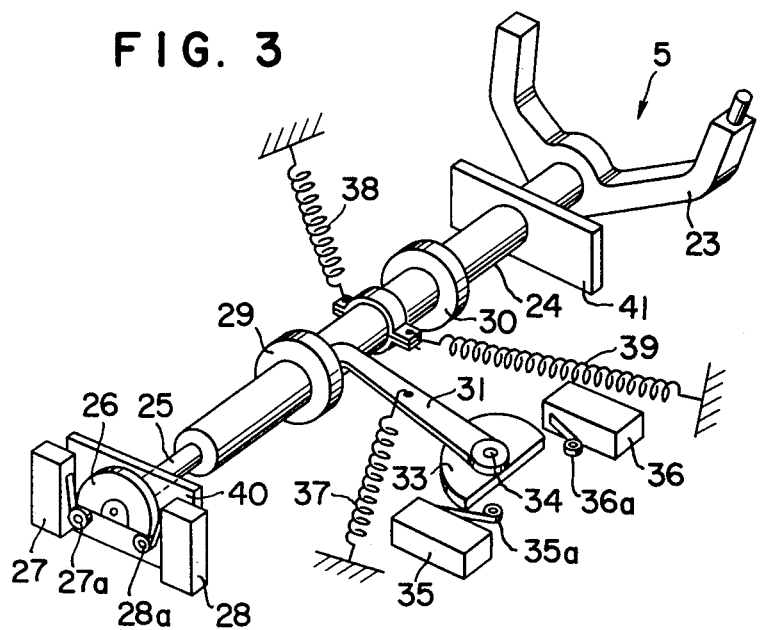
FIG. 3 shows a perspective view of the structure of the steering device.

As shown in FIG. 3, the steering device 5 includes a handle 23 in the shape of horns. The handle 23 is fixed to one end of a sleeve 24. A central shaft 25 is splined in the sleeve 24. A first operational sector 26 in the semicircular shape is fixed to the forward end of the central shaft. The actuators 27a, 28a of microswitches are disposed on both sides of the first operational sector 26. The microswitches 27, 28 are turned on and off by the rotation of the operational sector 26.

The sleeve 24 has stop flanges 29, 30 in the shape of a ring provided thereon at a certain interval. A rotary lever 31 is in abutment with the stop flange 29 at one end thereof. A second operational sector 33 is fixed to the base portion of the rotary lever 31. The second operational sector 33 and the rotary lever 31 are pivotally connected to a rotary pin 34. The actuators 35a, 36a of microswitches 35, 36 are provided on both sides of the second operational sector. The microswitches 35, 36 are turned on and off by the rotation of the second operational sector 33. The rotary lever 31 is urged toward the first operational sector 26 by a tension spring 37, and the sleeve 24 is urged away from the first operational sector 26 by tension springs 38, 39 disposed on both sides of the sleeve 24.

Adjacent to the first operational sector 26, a stop plate 40 secured to the box 2 is provided. A stop plate 41 also secured to the box 2 is disposed between the handle and the stop flange 30. When the player pulls the handle 23 toward him, the stop plate 40 prevents the first operational sector 26 from displacing together with the sleeve 24. The displacement of the sleeve 24 is adjusted by the engagement of the stop flange 30 with the stop plate 41.

Right and left turns, a pull-out and a push-in of the steering device 5 turn on and off the microswitches 27, 28, 35, 36. The turn-on and off of the microswitches change over solenoid valves 42, 43 of the hydraulic circuit shown in FIG. 4 causing the support frame 9 to incline backward and forward, and right and left.

Figure 4:
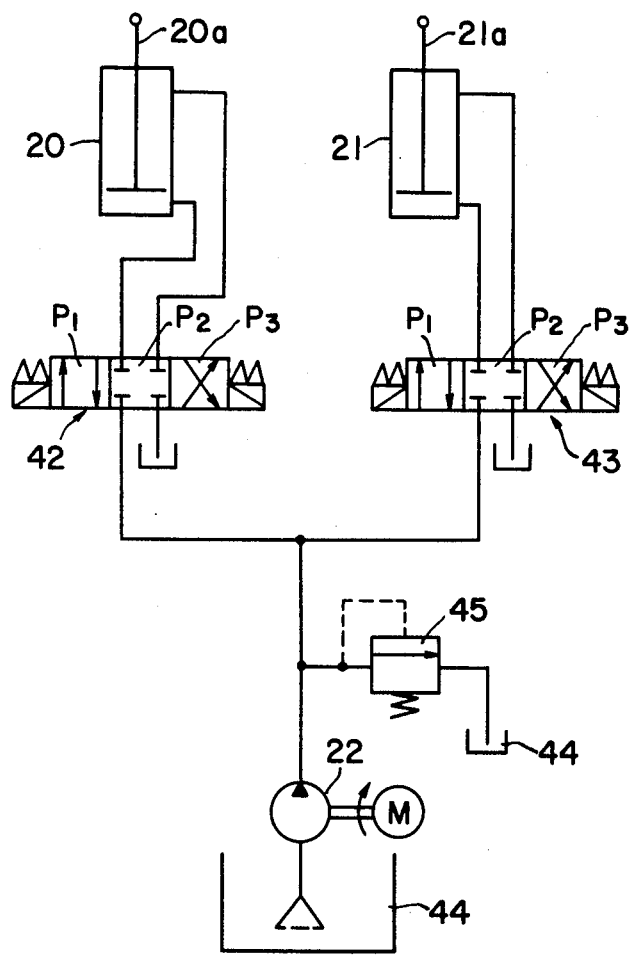
FIG. 4 shows a schematic construction of a hydraulic circuit.

The hydraulic circuit which actuates the hydraulic cylinders 20, 21 is made as shown in FIG. 4, for example. Each of the hydraulic cylinders 20, 21 is connected to one of the solenoid valves 42, 43 having 4 ports and 3 positions. The solenoid valves 42, 43 are connected to a hydraulic pump 22. The hydraulic pump 22 feeds oil to the hydraulic cylinders from a tank 44. A relief valve 45 is disposed between the hydraulic pump 22 and the solenoid valves 42, 43, and when both solenoid valves 42, 43 take the neutral position $P_2$, the oil returns to the tank 44.

The hydraulic circuit shown in FIG. 4 is an example and may be replaced with one of some of the known hydraulic circuits.

Next the operation of the monitor game machine of this invention will be explained.

With reference to FIG. 1, when the steering device 5 is turned clockwise (right), the microswitch 27 adjacent to the first operational sector 26 shown in FIG. 3 is turned on, and the solenoid valve 42 takes the position $P_1$, while the solenoid valve 43 takes the neutral position $P_2$ (may take the position $P_3$). Resultantly the hydraulic cylinder 20 extehds, and the frame 9 is inclined to the right with respect to the inner frame 10. Accordingly, the cock-pit 1 is inclined to the right. Conversely, when the steering device 5 is turned counter-clockwise, the solenoid valve 43 takes the position $P_1$, and the solenoid valve 42 takes the neutral position $P_2$ (may take the position $P_3$). The cock-pit 1 is inclined to the left.

When the steering device 5 is pushed in, the rotary lever 31 is turned toward the first operational sector 26 turning on the microswitch 35, and both solenoid valves 42, 43 take the position $P_1$. Resultantly both hydraulic cylinders 20, 21 are extended, and the frame 9 is inclined forward about the lateral shaft 11. The forward inclination of the cock-pit 1 makes the player feel as if an airplane were descending. When the steering device 5 is pulled toward the player, the microswitch 36 is turned on, and both solenoid valves 42, 43 take the position $P_3$ with the result that the frame 9 and the cock-pit 1 are inclined backward. The player is made to feel as if an airplane were really ascending.

When the turn of the steering device 5, and the push and pull thereof are carried out simultaneously, the signals from all the microswitches are combined, and the solenoid valves 42, 43 are suitably changed over to cause the cock-pit 1 to incline backward and forward with the cock-pit 1 kept inclined right and left. When a coin is put in, as shown in FIG. 4, both solenoid valves 42, 43 take the neutral position $P_2$, and after a passage of a given time, a power source is cut off, and both solenoid valves 42, 43 take the position $P_3$.

The cock-pit 1 can be inclined backward and forward, being kept inclined right and left by varying the speed of the piston rods of both hydraulic cylinders 20, 21 by using a different hydraulic circuit.

In this invention the cock-pit or driver cabin is adapted to swing by the hydraulic circuit, but the swing mechanism can be actuated by an electric motor.

The monitor game machine of this invention, which is structured as described above, can be swung backward and forward, and right and left by the steering device operated by a player sitting in the cock-pit or driver cabin, advantageously making the player feel really present in a situation displayed on the screen of the monitor.

What is claimed is:

1. A monitor game machine comprising: a cock-pit or driver cabin where a player is to be seated, a monitor disposed at the front of said cock-pit; frame means for supporting the cock-pit swingably backward and forward, and right and left; and a steering device operable by the player in response to pictures displayed on the monitor, said frame means having an inner frame which is supported swingably, on a first shaft extending in a direction, said shaft, by being oriented in said direction, supporting said inner frame so that said inner frame is swingable either in first backward and forward swingable directions or in second right and left swingable directions and an outer frame located so as to surround the inner frame, said first shaft being retained on retaining members secured to a support base, said outer frame being so connected, through a second shaft extending in a direction perpendicular to that of the first shaft, to the inner frame as to be swingable in the one of the first and second swingable directions different from the swingable directions of the inner frame, said outer frame being supported by operational means for swinging the frame means; said steering device being turnable right and left about its axis, and swingable along its axis backward and forward, the turn of the steering device causing the outer frame to incline right and left through the operational means, the backward and forward shifts of the steering device causing the inner frame to incline backward and forward through the operational means which comprises two cylinders connected at left and right sides of the outer frame and being operated independent of each other in response to the steering of the steering device.

2. A monitor game machine according to claim 1, wherein said steering device comprises a handle, a sleeve supporting said handle, and a central shaft housed slidably in said sleeve and rotatable integrally with said sleeve, a first operational sector being provided on said central shaft, on said sleeve through the intermediary of a rotary lever there being provided a second operational lever rotatable in response to the backward and forward movement of said sleeve, microswitches being provided on both sides of each of said sectors, said microswitches being turned on and off in response to the rotation of said sectors, switching the circuit of said operational cylinders.

* * * * *